United States Patent [19]

Isler et al.

[11] 4,356,300

[45] Oct. 26, 1982

[54] POLYETHERPOLYAMIDE COPOLYMERS

[75] Inventors: Walter Isler, Paspels; Eduard Schmid, Bonaduz, both of Switzerland

[73] Assignee: Inventa AG fur Forschung und Patentverwertung, Zurich, Switzerland

[21] Appl. No.: 123,224

[22] Filed: Feb. 21, 1980

[30] Foreign Application Priority Data

Feb. 26, 1979 [CH] Switzerland .................. 1866/79

[51] Int. Cl.³ ............................................. C08G 69/14
[52] U.S. Cl. ................................ 528/324; 528/339.3; 528/347
[58] Field of Search ................ 528/347, 324, 339.3

[56] References Cited

U.S. PATENT DOCUMENTS

| | | | |
|---|---|---|---|
| 3,083,188 | 3/1963 | Stuart et al. ................ | 260/18 N |
| 3,449,273 | 6/1969 | Kettenring et al. ........... | 260/18 N |
| 3,792,002 | 2/1974 | Krieger et al. .............. | 260/18 N |
| 3,843,609 | 10/1974 | Kimura et al. ............... | 528/336 |
| 3,882,090 | 5/1975 | Fagerburg et al. ........... | 528/339 |
| 4,024,116 | 5/1977 | Horn et al. ................... | 260/18 N |
| 4,062,820 | 12/1977 | Mitchell et al. .............. | 260/18 N |
| 4,122,229 | 10/1978 | Mitchell et al. .............. | 260/18 N |
| 4,133,803 | 1/1979 | Klein ........................... | 528/347 |

FOREIGN PATENT DOCUMENTS 565350  11/1944  United Kingdom .

*Primary Examiner*—Harold D. Anderson
*Attorney, Agent, or Firm*—Jordan B. Bierman; Linda G. Bierman

[57] ABSTRACT

Polyetherpolyamide copolymers are disclosed which comprise the product of the polycondensation of a diamine with the equivalent amount of a dicarboxylic acid and a common polyamide forming component, wherein the diamine contains a polyether block containing at least 3 ether oxygen atoms separated from each other by a carbon chain selected from the group consisting of linear carbon chains of at least 3 carbon atoms, branched carbon chains of at least 2 carbon atoms between the ether oxygen atoms and mixtures thereof and a common polyamide block which is mainly a homopolyamide. The present compositions exhibit improved flexibility and low temperature properties and may be processed by injection molding and extrusion techniques.

8 Claims, No Drawings

POLYETHERPOLYAMIDE COPOLYMERS

CROSS REFERENCE TO RELATED APPLICATION

The present application claims the priority of Swiss Application 1866/79-1, filed Feb. 26, 1979.

BACKGROUND OF THE INVENTION

The present invention relates to polyetherpolyamides, and particularly to polyetherpolyamides containing at least one polyether block.

It is known to modify homopolyamides exhibiting characteristically high rigidity, high melting point and a large degree of crystallinity, by copolymerization to impart a degree of flexibility to the final copolymer. Such copolyamides, however, have been found to exhibit reduced crystallinity and resistance to chemicals and distinctly lower melting points. Additionally, the processability of these copolyamides is substantially reduced as a result of the reduction in crystallinity and rate of crystallization, with the result that these polyamides have limited utility, in any, in processes such as extrusion, injection molding, powder coating or spinning of monofilaments and fibers. These materials have accordingly been utilized primarily as adhesives, as set forth in West German Patent Application No. 2,445,167.

There is great commercial interest and demand for polymeric materials exhibiting favorable flexibility, temperature and chemical resistance. Flexible materials are proposed for use in such items as conveyor belts and for joints and unbreakable mountings which undergo substantial shock in use. Flexible, cold shock-resistant polymers are also utilized in winter sports articles, such as ski boot covers, slalom sticks and the like. Flexible materials are likewise useful in the preparation of pipes and tubing for the automotive, aircraft and ship building industries, such as for oil, gas and temperature conduits.

Likewise, in the food industry, the demand is increasing for the development of flexible polymeric films containing no plasticizer component, particularly in the medical and comestible fields. Many polymers such as conventional rubbers are unsuitable due to their poor processability, i.e. their necessity to vulcanize in the mold, and hence incapability of processing by normal extrusion or injection molding processes. These materials have likewise exhibited unsatisfactory chemical resistance and insufficient transparency for certain applications. As a result, conventional rubbers have been replaced by various thermoplastic polymers which show improvement in the foregoing areas. These materials, however, frequently comprising flexible thermoplastic polyesters and polyurethanes, are likewise noted to exhibit certain unsatisfactory properties. For example, thermoplastic polyesters exhibit deficient hydrolysis resistance and lack of transparency, while thermoplastic polyurethanes are frequently unsuitable because of their relatively low utilization temperature. Further, both polyesters and polyurethanes have been found to be too expensive for many applications.

The preparation of so called polyetherpolyamides through modification of conventional polyamides by incorporation of polyether blocks, has been known for the purpose of attaining specific properties, such as increased colorability and moisture uptake and reduced electrostatic charge and is respectively disclosed in British Patent Specification No. 565,350, Japanese Patent Application No. 73 32610, and U.S. Pat. No. 3,843,609. Also, the preparation of polyamides soluble in polar organic solvents is disclosed in German Patent Application No. 1,720,699, while the preparation of water-soluble polyetherpolyamides is shown in U.S. Pat. No. 3,882,090. The polyamides possessing the above properties have achieved recognized utility, however, no high grade thermoplastically workable, flexible polymers are known which, by contrast with the above-described products, possess chemical corrosion and solvent resistance and low water uptake.

SUMMARY OF THE INVENTION

In accordance with the present invention, a polyetherpolyamide blockpolymer may be prepared by the polycondensation of a diamine with an equivalent amount of a dicarboxylic acid, wherein the diamine contains a polyether block having at least 3 ether oxygen atoms, said ether oxygen atoms separated by a carbon chain selected from the group consisting of linear carbon chains containing at least 3 carbon atoms, branched carbon chains containing at least 2 carbon atoms between the ether oxygen atoms, and mixtures thereof. The polyether block is present in an amount of from about 8 to about 60% by weight of the total polyetherpolyamide composition. The remainder beeing a common polyamide, mainly a homopolyamide as polyamide 6, 11 or 12.

The present invention further includes a method for the preparation of the polyetherpolyamides which method comprises mixing the reactants comprising the diamine, the dicarboxylic acid and the additional polyamide-forming compound(s), subjecting the mixture to a compression-phase which depends on the nature of the additional polyamide forming component, realising the pressure and degassing the molten polymer under a stream of inert gas, mainly nitrogen for a period of time exceeding one hour, and at an elevated temperature.

In a preferred embodiment of the present invention, the diamine component of the polyetherpolyamide composition has from about 6 to about 30 ether oxygen atoms separated from one another by a linear aliphatic carbon chain, each carbon chain containing from 3 to 4 carbon atoms. The dicarboxylic acid component may be selected from the group consisting of terephthalic acid, isophthalic acid, dimerised fatty acids and mixtures thereof. A preferred dicarboxylic acid comprises a dimerised fatty acid having 36 carbon atoms.

The compositions of the present invention, by providing a separation between the individual ether groups exhibit improved flexibility, temperature resistance, resiliency, bend recovery, high melting point, and corrosion and solvent resistance. Further, high shock and notched-bar impact resistance are exhibited at even favorably reduced temperature ranges, and the materials are amenable to processing by extrusion or injection molding to form a variety of products such as tubes, profiles, films, mono-filaments and the like. The materials may also be prepared in an appearance ranging from translucent to transparent.

The excellent processability makes it easy to modify the product with all kinds of additives, like stabilizers, processing aids, pigments, fillers, glass-fibers, flame retarders, mostly in the molten state of the polymer through common methods.

Accordingly, it is the principal object of the present invention to prepare a polyetherpolyamide which exhibits improved flexibility, temperature resistance and resistance to shock and impact at low temperatures.

It is a further object of the present invention to prepare a polyetherpolyamide as aforesaid that is suitable for processing by extrusion and injection molding and powder coating techniques.

It is yet a further object of the present invention to prepare a polyetherpolyamide as aforesaid which exhibits improved chemical and corrosion resistance, and is capable of being transparent in the finished state.

Other objects and advantages will become apparent to those skilled in the art from a consideration of the ensuing specification.

DETAILED DESCRIPTION OF THE PREFERRED EMBODIMENT

In accordance with the present invention, the foregoing objects and advantages are readily attained.

The polyetherpolyamides of the present invention are prepared by a polycondensation of a diamine with approximately the equivalent amount of a dicarboxylic acid, in which the diamine contains a polyether block having at least 3 ether oxygen atoms, which ether oxygen atoms are separated from each other by carbon chains of at least 3 carbon atoms length, in the instance of a linear chain, and at least 2 carbon atoms length in the instance of a branched chain. The polyether block should be present in the composition in an amount ranging from 8 to 60% by weight of the total composition. Additionally, the composition containing other polyamide-forming compounds as part thereof.

The diamine component of the present composition preferably contains from 6 to 30 ether oxygen atoms, each separated from one another by a linear aliphatic carbon chain having from 3 to 4 carbon atoms or 2 carbon atoms in the case of branched carbon chains. The present invention however is not limited to aliphatic carbon chains, but encompasses branched aliphatic, cycloaliphatic, and branched araliphatic carbon atom chains.

In one preferred embodiment, the diamine of the present invention may possess the formula $$H_2N-[-(CH_2)_n-O-]_m-(CH_2)_n-NH_2$$

wherein n is at least 3, and preferably ranges from 3 to 4; m ranges from 3 to 30; and the value of n may vary within a given preparation. The preparation of diamines meeting these structural limitations is known and is, for example, disclosed in German Patent Application No. 2,749,972.

A particularly preferred diamine comprises a compound known as bis(3-aminopropyl)-polytetrahydrofuran, manufactured by the BASF Corporation, of Ludwigshafen, West Germany, which comprises a diamine mixture possessing the following formula, $$H_2N-(CH_2)_3-O-[-(CH_2)_4-O-]_p-(CH_2)_3-NH_2$$

wherein p may range from 2 to 30, and preferably from 6 to 30.

The dicarboxylic acids useful in the present invention include materials selected from the group consisting of terephthalic acid, isophthalic acid, dimerised fatty acids and mixtures thereof. In particular, a commercial mixture of dimerised fatty acids having 36 carbon atoms may be used which is available for example under the tradename EMPOL ® Dimer and Trimer Acids, and is manufactured by Unilever Emery, Netherlands. A specially preferred dimerised fatty acid is one with a high content of dicarboxylic acid and a low level of mono- and polycarboxylic acids. A dimerised fatty acid of this type is Empol ®1010. Additionally, a suitable dicarboxylic acid may be employed which possesses the formula

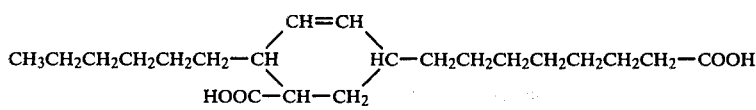

and which is available as "Diacid 1550", manufactured by Westvaco, Inc., Charleston, W.Va.

The present composition contains additional polyamide-forming compounds. These compounds include the conventional monomers utilized in the preparation of the various nylons, and may in certain instances extend to oligomers and precondensates and other derivatives of these monomers as well. In particular, caprolactam, laurolactam and 11-aminoundecanoic acid, are suitable and may be employed.

The method of the present invention comprises a polycondensation reaction between the diamine and the dicarboxylic acid that in addition reaction with the normal polyamid forming monomer and so forming the inventive blockpolymer. The reaction is normally preformed in one step, but modifications are possible for example a step-wise addition of the dicarboxylic acid and later the diamine to the polymerising normal polyamide monomers.

The polyamide-forming constituent of the present composition may include not only monomers but oligomers or precondensates, and polyetherpolyamide compositions may be prepared which contain conventional polyamide chains, such as homopolyamide and copolyamide blocks adjacent to polyether blocks containing from 3 to 30 ether oxygen atoms.

The foregoing materials are reacted, preferably in an autoclave, and may be heated under a pressure of up to about 20 atmospheres to a temperature sufficient to cause ring-opening of the normal polyamide monomers (lactams) to take place at 260° C. for caprolactam and 290° C. for laurolactam. Heating is conducted under pressure for 1 to 6 hours, after which the pressure is released and the molten polymer degassed for a period of no less than about one hour, and preferably up to about seven hours, under an inert gas-stream.

After completion of the degassing step, the molten product may be recovered by first conducting it as a strand in water, followed by granulation, eventually extracting and drying.

The polyetherpolyamides of the present invention exhibit the properties of high melting point and resistance to chemicals typical of homopolyamides, as well as the flexibility and deformability characteristics of elastomeric materials such as rubbers, butadiene-styrene block copolymers, thermoplastic polyetheresters and the like.

The present invention will be better understood from a consideration of the following illustrative examples.

EXAMPLE 1

1.135 kilograms of bis(3-aminopropyl)polytetrahydrofuran, having a molecular weight of approximately 800, were melted down with 0.8 kilogram of a dimerised fatty acid containing 36 carbon atoms, known as EMPOL ®1010, and 5.8 kilograms of caprolactam, in a 20 liter capacity autoclave. The melt was brought to a pressure of 18 to 20 atmospheres and a temperature of approximately 260° C., within a period of one hour. Immediately thereafter, the pressure was released over a period of one hour, while the temperature remained at 260° C., followed by degassing the molten product at the same temperature for a period of over five hours. The melt, was pressed in water, granulated after solidification and dried. The product could be injection moulded into test bodies or extruded into shapes such as pipes.

EXAMPLE 1a (COMPARATIVE)

A polyamide was prepared by the method disclosed and employed in Example 1, with the exception that hexamethylenediamine was utilized in place of the bis(3-aminopropyl)polytetrahydrofuran. The reaction products of both examples were tested for various properties and the results are set forth in the annexed Table.

EXAMPLE 2

2.00 kilograms of bis(3-aminopropyl)polytetrahydrofuran having a molecular weight of about 800, were melted down with 0.41 kilograms of terephthalic acid in a 20 liter capacity autoclave. The melt was brought to a compression phase of 20 atmospheres for 1 hour at 260° C. The pressure was subsequently released over a period of one hour, while maintaining the temperature at 260° C., and degassing of the reaction product was conducted thereafter over a period of approximately seven hours while the reaction product was protected by a stream of nitrogen. The melt was pressed in water, granulated, extracted with water and dried. The resulting product could easily be injection molded into test bodies, and could be extruded into pipes. As with Examples 1 and 1a, the product of this example was tested, and the properties of the product evidenced by the results of these tests are set forth in the Table.

EXAMPLE 3

A polyetherpolyamide was prepared in identical manner to that employed in Example 2, with the exception that the dicarboxylic acid reactant was isophthalic acid, in place of terephthalic acid. The resulting product exhibited comparable properties and processability to that of the product of Example 2, and the results of the identical tests performed on it are likewise set forth in the Table.

EXAMPLE 4

6.5 kilograms of bis(3-aminopropyl)polytetrahydrofuran having a molecular weight of about 800, 4.55 kilograms of the dimerised fatty acid employed in Example 1, and 17 kilograms of laurolactam were melted together in a melt-tank that was heated with saturated steam of a pressure of 12 atmospheres. The resulting melt was pressed through a filter into a 50 liter capacity autoclave, and was then subjected to a pressure of from 15 to 20 atmospheres for a period of six hours at a temperature of 290° C. After releasing the pressure the product was degassed at a temperature of 270° C. under a stream of nitrogen until the desired melt viscosity was achieved (about 7 hours).

After cooling in a waterbath and subsequent granulation, a granulate was obtained which could be easely injection moulded into all types of test bodies, or could be extruded into pipes. The final product was tested to determine its properties, and the results are set forth in the Table.

EXAMPLE 4a (COMPARATIVE)

A polyamide was prepared in the same manner outlined with respect to Example 4, with the exception that the diamine component was hexamethylenediamine, rather than bis(3-aminopropyl)polytetrahydrofuran. The properties of the resulting product were tested and reported in the Table, infra.

EXAMPLE 5

3.17 kilograms of bis(3-aminopropyl)polytetrahydrofuran having a molecular weight of approximately 800, 2.32 kilograms of a dimerised fatty acid identical to that utilized in Examples 1 and 4, and 30.6 kilograms of laurolactam were melted together in a melt-tank heated with saturated steam of 12 atmospheres pressure. The resulting melt was pressed through a filter into a 50 liter autoclave, where a compression phase with a pressure of 20 atmospheres and a temperature of 290° C. was conducted for a period of about six hours. After releasing the pressure, the product was degassed at a temperature of about 270° C., until the desired melt viscosity was achieved (2.5 hours). The melt was pressed in water and subsequently granulated, and a crude granulate was obtained which could easily be injection moulded into test bodies or extruded into pipes. As with the previous examples, the granulate was tested, and the results of such tests illustrating the properties of the granulate are set forth in the Table appearing below.

TABLE

| Test Test Standard: DIN-Units | | Example 1 | Comparative Example 1 a | Example 2 | Example 3 | Example 4 | Comparative Example 4 a | Example 5 |
| --- | --- | --- | --- | --- | --- | --- | --- | --- |
| Impact strength (notched) dry, DIN 53453 | kJ/m$^2$ | intact | 10 | intact | intact | intact | | 17,3 |
| Impact strength dry, DIN 53453 | kJ/m$^2$ | intact | intact | intact | intact | intact | | intact |
| Flexural strength dry, DIN 53452 | N/mm$^2$ | 20 | | 34 | 29 | 16 | | 35 |
| Modulus of elasticity dry, DIN 53452 | N/mm$^2$ | 265 | | 575 | 629 | 250 | | 390 |
| Melting point DTA (maximum) | °C. | 210 | 199 | 207 | 207 | 158 | 126 | 176 |

| Test | Example | | | | | | |
|---|---|---|---|---|---|---|---|
| Test Standard: DIN-Units | Example 1 | Comparative Example 1 a | Example 2 | Example 3 | Example 4 | Comparative Example 4 a | Example 5 |
| Solidification point DTA °C. | 158 | 152 | 151 | 150 | 127 | 71 | 138 |

DTA = differential thermal analysis

The polyetherpolyamides of the present invention find wide utility due to their improved flexibility and temperature stability and can be utilized, for example, as a coating material applied and sintered in powder form.

Further the easy plastification of the inventive products, for example in a twin screw extruder permits their mixing and blending with all kinds of stabilizers and additives, like processing-aids, fillers, minerals, glass-fibres, flame retarders and the like.

Finally, flexible elastic fibres of high resistance and high elasticity can also be prepared.

What we claim is:

1. A thermoplastically processable, flexible polyether polyamide composition comprising the poly-condensation product of
    a diamine having a polyether block taken from the class consisting of $$H_2N-[-(CH_2)_n-O-]_m-(CH_2)_q-NH_2 \quad (I)$$

and $$H_2N-(CH_2)_3-O-[-(CH_2)_4-O-]_p-(CH_2)_3-NH_2 \quad (II)$$

wherein n and q are individually at least 3, m is 3 to 30, and p is 2 to 30, and
a dicarboxylic acid, whereby said polyether block is present in an amount of about 8 to about 60% by weight of said composition, said composition further comprising at least one polyamide constituent taken from the class consisting of caprolactam, laurolactam, and aminoundecanoic acid, the sum of all constituents being 100%.

2. A composition of claim 1 wherein n and q are individually 3 to 30.

3. The composition of claim 1 wherein said diamine is (II).

4. The composition of claim 1 wherein said diamine is (I).

5. The composition of claim 1 wherein said dicarboxylic acid comprises a dimerised fatty acid having 36 carbon atoms.

6. The composition of claim 1 wherein said dicarboxylic acid comprises a compound of the formula

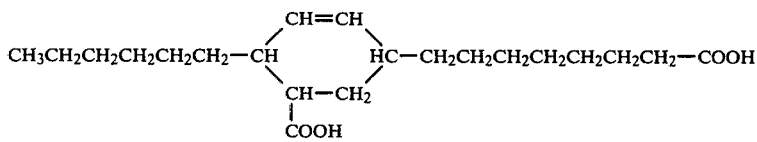

7. The composition of claim 2 wherein said ether oxygen atoms are separated from each other by a branched carbon chain selected from the group consisting of branched aliphatic chains, branched cyclo aliphatic chains, branched araliphatic chains and mixtures thereof.

8. The composition of claim 2 wherein the ether oxygen atoms are separated from each other by linear carbon chains which have 3 or 4 carbon atoms.

* * * * *